UNITED STATES PATENT OFFICE.

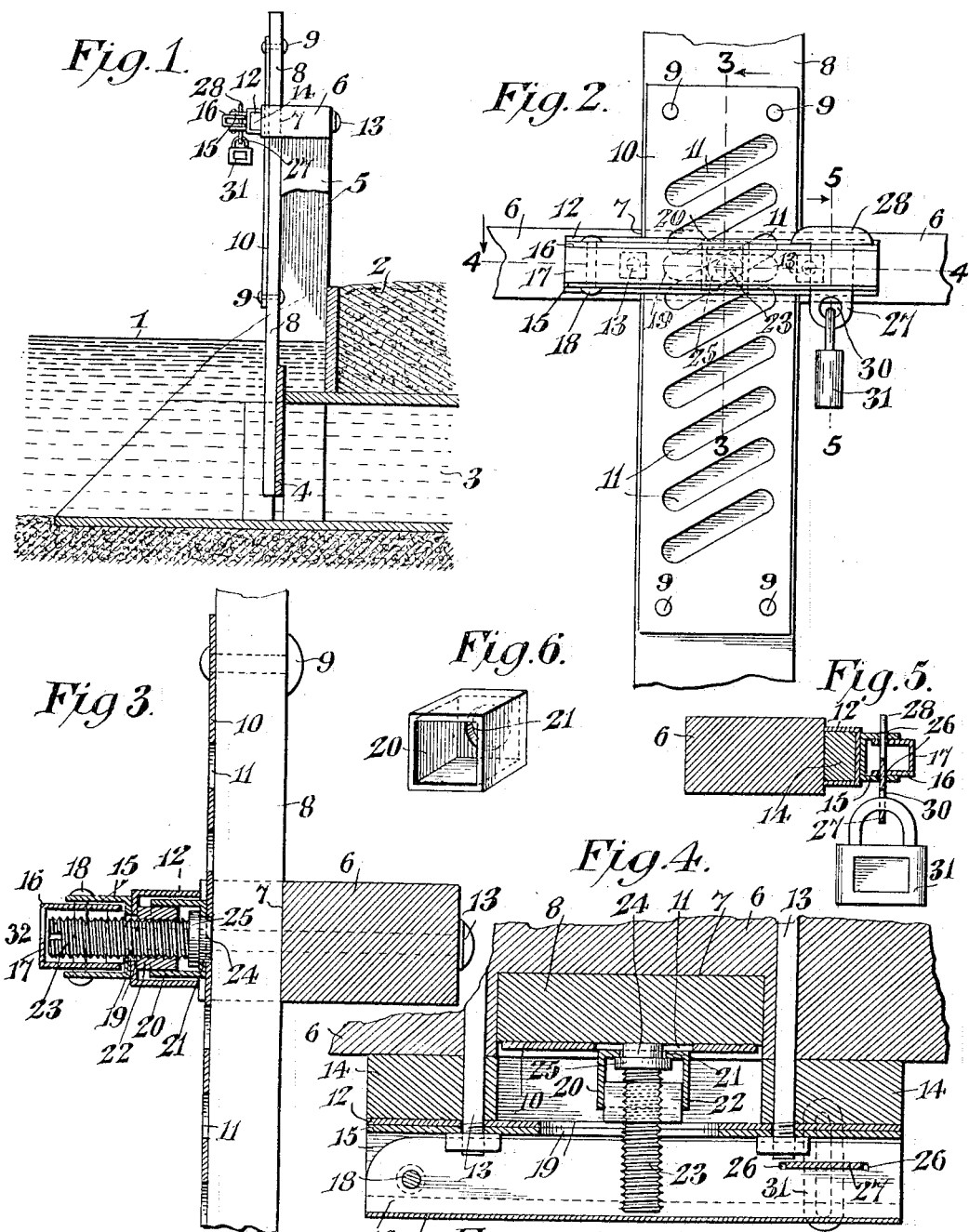
F. N. CRONHOLM.
LOCKING MEANS FOR GATES OF IRRIGATING CANALS.
APPLICATION FILED JAN. 23, 1914.
1,121,170. Patented Dec. 15, 1914.
WITNESSES
Jas. K. McCathran
F. T. Chapman
Frederick N. Cronholm, INVENTOR
BY E. G. Siggers
ATTORNEY

FREDERICK N. CRONHOLM, OF RUPERT, IDAHO.

LOCKING MEANS FOR GATES OF IRRIGATING-CANALS.

1,121,170.   Specification of Letters Patent.   Patented Dec. 15, 1914.

Application filed January 28, 1914. Serial No. 814,976.

*To all whom it may concern:*

Be it known that I, FREDERICK N. CRONHOLM, a citizen of the United States, residing at Rupert, in the county of Minidoka and State of Idaho, have invented a new and useful Locking Means for Gates of Irrigating-Canals, of which the following is a specification.

This invention has reference to improvements in locking means for gates of irrigating canals, and its object is to provide a device for the purpose of permitting accurate adjustments to be made without the possibility of change of the adjustments except the gate is unlocked by an authorized person. With most locking devices heretofore in actual use it is not possible to make accurate adjustments, since the gates can be locked only at spaced points of adjustment, for which reason where many tap boxes are employed the accumulated waste is very great and it is a matter of very material moment in arid regions, such as are found in the western portion of the United States, to very carefully conserve the water supply.

In irrigating systems the irrigating canal must in many instances carry water to be diverted to hundreds of farms along its course, and it is therefore of great importance that only the proper amount of water be diverted to each lateral to give each water user his just dues but without waste. Certain wastage such as that which occurs from seepage and evaporation is unavoidable, but unnecessary waste is practically wholly obviated by the present invention since very accurate adjustment of the gates is readily brought about and each user is assured within very narrow limits of the amount of water to which he is entitled.

Under prevailing conditions of water distribution in irrigating systems, adjacent farm units having the same surface and subsoil and raising the same kind of crops will at the end of the irrigation season have used different amounts of water. Water for irrigation purposes must, therefore, be sold by the acre-foot or fraction thereof rather than by the season, or in the form of a perpetual water right. Hence, if a user demands a certain flow of second feet because he feels that he needs it and is entitled to its use, the distributer is bound to give it to him, but with the means at hand the distributer has often to give the user more than he demands because the nearest adjustment of the gates possible or practicable gives too much water, and hence the over amount is mere waste.

The present invention has to do more particularly with small head gates that may be raised by hand and which do not require gearing in their manipulation, and the invention provides a means for the accurate adjustment of the amount of water supplied and, furthermore, the adjustment cannot be changed by the maliciously inclined.

The invention comprises a gate support or carrying stem customarily arranged in an upright position and provided with a series of inclined elongated receptacles for a locking pin, such receptacles being substantially parallel one with the other and with the lower end of each receptacle on the level with the higher end of the next lower receptacle in order, whereby the lower end of each receptacle located on one side of the upright center line of the stem overlaps in position the higher end of the next lower receptacle, which higher end is located on the opposite side of the upright center line of the stem, and this overlapping is to an extent to permit the holding of the stem at any position of upright adjustment within the range of the series of receptacles. The holding means which may be in the shape of a pin, is provided with a carrier so constructed that the pin is completely inclosed or covered and is wholly inaccessible unless the covering means be removed, and such removal by the maliciously inclined may be prevented by a suitable lock.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation with some parts in section showing the gate in the partly opened position. Fig. 2 is a face view on a larger scale than Fig. 1 of a portion of the gate carrying stem and the locking means therefor. Fig. 3 is a section on the line 3—3 of Fig. 2, some distant parts being omitted. Fig. 4 is a section on the line 4—4 of Fig. 2, but drawn on a larger scale. Fig. 5 is a section on the line 5—5 of Fig. 2. Fig. 6 is a perspective view of a nut carrying box for the locking pin.

Referring to the drawings there is shown in Fig. 1 a more or less schematic representation of a supply canal 1, the showing including an indication of a portion of a canal bank 2 and a lateral 3, all of which parts may follow the usual practice, wherefore no particular description is needed. The lateral 3 is provided with a gate 4 which may be of a type adapted for hand manipulation. Rising from that portion of the lateral supplied by the gate 4 is a frame composed of side posts 5 and a cross beam 6, and at a point about midway of the length of the cross beam 6 the latter is cut away or recessed, as indicated at 7, to receive a stem 8 of sufficient length, said stem carrying the gate 4 at its lower end and movable lengthwise of itself but crosswise of the beam 6 through the recess 7. The stem 8 which may be made of metal or wood, has secured thereto by rivets 9 or other suitable means, a face plate 10 applied to that face of the stem 8 remote from the beam 6. The face plate 10 is shown as provided with a series of slots 11 which may be parallel one with the other and extend diagonally of the plate, so as to incline with relation to the upright center line of the stem 8. The slots 11 are somewhat elongated and extend to opposite sides of the longitudinal center line of the stem and are so arranged that the lower ends of all the slots are on one side of the center line and the higher ends are on the other side of the center line, and each slot has its lower end lower than or in overlapping relation to the higher end of the next lower slot, which higher end is located on the other side of the longitudinal center line of the stem from said lower end.

Secured to the cross beam 6 on opposite sides of the recess 7 is an elongated channel piece 12 of substantially U form in cross section with the sides of the U member bearing against the beam 6 and this channel member is secured to the beam by bolts 13 with blocks 14 lodged in the channel to prevent collapse thereof under the strain of the bolts. Made fast to the outer or yoke portion of the channel member 12 is another channel member 15 with the open side of the channel outwardly and the yoke side against the yoke side of the channel member 12, the bolts 13 traversing the yoke portion of the channel member 15 and so holding it against the channel member 12 in rigid relation to the beam 6. Adapted to the channel member 15 is another channel member 16 so related that its side members enter between the side members of the channel member 15, and the yoke portion of the channel member 16, which yoke portion is indicated at 17, is outward. The channel member 16 is connected to the channel member 15 near corresponding ends of each by a pivot pin 18 traversing the side members of both channel members 15 and 16, the arrangement being such that the channel member 16 may be turned about the pivot 18 so as to expose the interior of the channel member 15, or to bring the side members of the channel member 16 into the channel member 15.

Extending through the yoke portions of both channel members 12 and 15 are matching slots 19 elongated in the direction of the length of said channel members and having a length as great as the horizontal extent of the series of slots 11.

Lodged in the channel member 12 between the plate 10 and the yoke portion of said channel member is a box 20 having one end open and the other end closed, and this closed end is formed with a passage or perforation 21. The box 20 is designed to receive a nut 22, the box being of an interior size to receive the nut snugly yet freely, and the cross sectional shape of the box corresponds to the shape of the nut, so that while the nut may move freely lengthwise of the box, or toward and from the closed end thereof, it cannot turn within the box, nor can the box turn because of its shape which may be substantially rectangular and the close approach of its top and bottom walls to the side portions of the channel member 12. The box, however, may move freely in the channel member 12 between the spacing blocks 14.

Traversing the nut 22 is the threaded end of a threaded locking pin 23, said pin terminating at one end in a head 24 free from threads, and, therefore, smooth, and also between the head 24 and the threaded portion of the head 23 it is formed with a radially outstanding circumferential flange 25. The head 24 is of a size to move readily through the passage 21 and is of a length to project beyond the closed end of the box 20 into any one of the slots 11, while the flange 25 forms an abutment to engage the inner wall of the closed end of the box 20 to thereby limit the projection of the head 24 from the outer face of the closed end of the box 20.

The side walls of the channel members 15 and 16 near the end remote from the pivot pin 18 are traversed by matching slots 26 adapted to the passage of a plate 27 having one end laterally expanded, as shown at 28, so as to stop the movement of the plate 27 through the slots 26, while that end of the plate 27 remote from the expanded portion 28 is provided with a perforation 30 designed to receive the hasp of a lock 31, which latter may be of any suitable known construction, such as the familiar Yale lock.

That end of the pin 23 remote from the head 27 is formed with a transverse slot or notch 32 similar to the screw driver slot of an ordinary screw, and the plate 27 may have one of its ends or both of its ends shaped to enter the slot or notch 32 for the purpose of turning the pin 23 in the nut 22.

The locking pin 23, together with the nut 22 and box 20, are movable in the supporting members 12 and 15 constituting a fixed support for the locking pin, to an extent permitted by the length of the slots 19, and this extent of travel in a direction lengthwise of the beam 6 and transverse of the stem 8 is sufficient to include the full lateral extent of the series of slots 11. When the screw pin 23 is turned in the appropriate direction the nut 22 is forced against the inner wall of the yoke portion of the channel member 12, and then further turning of the screw pin causes the head 24 to move into a slot 11 until the flange 25 locks firmly against the inner wall of the box 20 and the latter is forced into firm engagement with the outer face of the plate 10. The frictional engagement of the parts is such that the box 20 cannot be moved laterally by any force to which it is subjected, and as the head 24 of the pin 23 is lodged in a slot 11, the stem 8 is held in the position in which it is locked. To prevent any malicious tampering with the device the channel member 16, which during the manipulation of the pin 23 is moved to the open position, is now closed, thus covering the pin 23 against access, and when the slots 26 are brought into matching relation the locking plate 27 is passed through them and the lock 31 is applied. The adjusting parts of the locking device are therefore all covered against access and the gate must remain in the adjusted position until a properly authorized person provided with a key for the padlock 31 removes the latter, thus permitting access to the gate locking means for further adjustment of the gate. The nut ends of the bolts 13 are also covered by the cover channel member 16, so that tampering with the lock cannot be brought about by removing the bolts.

The up or down adjustment of the gate may be effected as minutely as desired throughout the length of a slot 11 without removing the head 24 of the pin 23 therefrom, but if a greater adjustment is required, then the pin 23 is manipulated to move the nut 22 to the flange 25, whereupon the pin is readily pulled out of the slot 11 in which it is seated and the gate stem may be moved up or down to permit the insertion of the head 24 in some other one of the slots. This constitutes a coarse adjustment of the gate, but the fine or accurate adjustments are brought about while the head 24 remains in the particular slot in which it is lodged, these finer adjustments being limited to the vertical range determined by the inclination and length of the slot 11. Since the slots 11 are backed up by the stem 8, or whether some other arrangement be provided, or even in the case where no backing is provided for the slots 11, they may be termed receptacles for the adjusting and locking pin. These receptacles are arranged in a longitudinal series and are transversely inclined with respect to the length of the supporting stem of the gate and are spaced apart in the direction of the length of the series to extents to cause the receptacles of the series to be in overlapping spaced relation throughout the length of the series.

Instead of making certain parts separately they may be made either effectively or actually together or in one piece. For instance, the channel members 12 and 15 and the blocks 14 may be formed together and the other parts associated therewith in the manner described. These, however, are constructional details well within the province of the manufacturer.

What is claimed is:—

1. In locking means for gates of irrigating canals, the combination with a gate having a stem provided with a longitudinal series of inclined overlapping spaced receptacles, and a locking device movable into and out of any one of the receptacles and also movable laterally of the length of the stem.

2. The combination with a gate for irrigating canals, of a means for supporting the gate, along which means the gate is movable to different adjusted positions, and means for locking the gate in the different adjusted positions comprising an elongated member provided with a longitudinal series of laterally extended inclined spaced overlapping receptacles, and a member coacting with the first-named member and movable into and out of any of the receptacles at different points along the length thereof, one of said coacting members being secured to and movable with the gate and the other being mounted on the means for supporting the gate.

3. In a locking means for gates of irrigating canals, the combination with a gate, of a stem therefor provided with a longitudinal series of laterally inclined spaced overlapping receptacles, a guide member for the stem, and a locking member carried by the guide member in position to enter any one of the receptacles, said locking member being movable in the guide member laterally of the stem.

4. In a locking means for gates of irrigating canals, a stem for the gate having a longitudinal series of laterally inclined spaced overlapping receptacles, a locking pin adapted to any one of the receptacles, and a support for the locking pin in which it is movable transversely of the stem.

5. In a locking means for gates of irrigating canals, a stem for the gate having a longitudinal series of laterally inclined spaced overlapping receptacles, a locking pin adapted to any one of the receptacles, and a support for the locking pin in which it is movable transversely of the stem, said support being provided with a cover member for the pin, and means for locking said cover member in the pin covering position.

6. In a locking means for gates of irrigating canals, a gate carrying stem provided with a longitudinal series of inclined spaced overlapping receptacles, a guide means for the stem, a support in traversing relation to the stem, a locking pin carried by the support and movable laterally of the stem and adapted to engage in any one of the receptacles, and means for covering the locking pin from unauthorized access.

7. In a locking means for gates of irrigating canals, a gate supporting stem provided with a longitudinally arranged series of laterally inclined spaced overlapping receptacles, a channel structure in transverse relation to the length of the stem, said channel structure having an elongated passage therethrough extending transversely of the stem, a threaded pin carried by the channel structure, a threaded member traversed by the pin, means in the channel structure for holding the threaded member against turning and constructed to permit movement of the pin lengthwise of the elongated passage in the channel structure, and means carried by the channel structure for covering the pin against unauthorized access.

8. In a locking means for gates of irrigating canals, a gate carrying stem, a plate thereon having a longitudinally extended series of transversely inclined slots therethrough, said slots being in spaced overlapping relation one to the other, oppositely-directed channel members arranged transversely of the length of the stem and provided with matching elongated slots extending transversely of the length of the stem in spaced relation to the plate of the stem, a box movable in one of the channel members in juxtaposition to the plate on the stem, a nut lodged in the box, a threaded pin traversing the nut and extending through the box and adapted to enter in one of the slots in the plate on the stem, and a cover member carried by one of the channel members in position to be moved into and out of covering relation to the threaded pin.

9. In a locking means for gates of irrigating canals, a gate carrying stem, a plate thereon having a longitudinally extended series of transversely inclined slots therethrough, said slots being in spaced overlapping relation one to the other, oppositely directed channel members arranged transversely of the length of the stem and provided with matching elongated slots extending transversely of the length of the stem in spaced relation to the plate on the stem, a box movable in one of the channel members in juxtaposition to the plate on the stem, a nut lodged in the box, a threaded pin traversing the nut and extending through the box and adapted to enter in one of the slots in the plate on the stem, and a cover member carried by one of the channel members in position to be moved into and out of covering relation to the threaded pin, said cover member and the channel member carrying it being coactively constructed for the application of locking means thereto.

10. In a locking means for gates of irrigating canals, the combination with a gate, of a stem therefor, provided with a plate having a longitudinally arranged series of transversely inclined spaced overlapping slots, a guide member for the stem, oppositely-directed channel members carried by the guide member and both channel members having matching elongated slots extending transversely of the channel member over the guide member, a box lodged in the channel member adjacent to the guide member in position to engage the slotted plate on the stem and held by the channel member against turning, a nut lodged in the box against turning, a threaded pin traversing the nut and provided with a head at one end extending through the corresponding end of the box and a flange for engaging the box, said pin having the end remote from the head shaped for the application of a tool, another channel member pivoted to the outer channel member for movement into and out of the outer channel member about the pivot into and out of covering relation to the pin, said last-named pivoted channel member and the channel member receiving it having coacting slots, and a lock member adapted to the slots and also shaped for application to the tool receiving end of the threaded pin.

11. In a locking means for gates of irrigating canals, a gate carrying stem provided with a longitudinal series of independent receptacles all inclined in the same direction and having substantially the same lateral extent with respect to the stem with one end of each receptacle in overlapping relation in the direction of the length of the stem to the other end of the next adjacent receptacle, and a locking means for the stem including a pin adapted to the receptacles and movable transversely of the stem.

12. In a locking means for gates of irrigating canals, a gate carrying stem provided with a longitudinal series of independent receptacles all inclined in the same direction and having substantially the same lateral extent with respect to the stem with one end of each receptacle in overlapping relation in the direction of the length of the stem to the other end of the next adjacent receptacle, and a locking means for the stem including a pin adapted to the receptacles and movable transversely of the stem, said locking means being also provided with means for holding the pin against movement transversely of the stem and with means for covering the pin against unauthorized access.

In testimony, that I claim the foregoing as my own, I have hereto affixed my signature in the presence of two witnesses.

FREDERICK N. CRONHOLM.

Witnesses:
A. B. BROWN,
EDWARD WILSON.

Copies of this patent may be obtained for five cents each, by addressing the "Commissioner of Patents, Washington, D. C."